(12) United States Patent
Kim et al.

(10) Patent No.: US 9,178,213 B2
(45) Date of Patent: Nov. 3, 2015

(54) NEGATIVE ACTIVE MATERIAL, METHOD OF MANUFACTURING THE SAME, AND LITHIUM BATTERY INCLUDING THE NEGATIVE ACTIVE MATERIAL

(71) Applicant: Samsung SDI Co., Ltd., Yongin, Gyeonggi-Do (KR)

(72) Inventors: Beom-Kwon Kim, Yongin (KR); Jae-Myung Kim, Yongin (KR); So-Ra Lee, Yongin (KR); Ui-Song Do, Yongin (KR); Chang-Su Shin, Yongin (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 149 days.

(21) Appl. No.: 13/826,415

(22) Filed: Mar. 14, 2013

(65) Prior Publication Data

US 2014/0106230 A1    Apr. 17, 2014

(30) Foreign Application Priority Data

Oct. 11, 2012    (KR) .......................... 10-2012-0113028

(51) Int. Cl.
*H01M 4/38*    (2006.01)
*H01M 4/04*    (2006.01)
(Continued)

(52) U.S. Cl.
CPC .............. *H01M 4/386* (2013.01); *H01M 4/0471* (2013.01); *H01M 4/1395* (2013.01); *H01M 4/366* (2013.01); *H01M 4/583* (2013.01); *H01M 4/625* (2013.01); *H01M 2300/004* (2013.01);

(Continued)

(58) Field of Classification Search
CPC .... Y02E 60/122; H01M 4/134; H01M 4/386; H01M 4/366; H01M 2004/027
USPC ............................................ 429/231.8, 231.9
See application file for complete search history.

(56) References Cited

U.S. PATENT DOCUMENTS 7,214,445 B2    5/2007   Miyaki
2002/0164479 A1*  11/2002   Matsubara et al. ........... 428/367
(Continued)

FOREIGN PATENT DOCUMENTS

JP    2002-124254 (A)    4/2002
JP    2010-097761 (A)    4/2010
(Continued)

OTHER PUBLICATIONS

P. Bhattacharya et al., "Nanocrystalline TiAl powders synthesized by high-energy ball milling: effects of milling parameters on yield and contamination," *Journal of Alloys and Compounds* 368 (2004) 187-196.

(Continued)

*Primary Examiner* — Stewart Fraser
(74) *Attorney, Agent, or Firm* — Knobbe Martens Olson & Bear LLP

(57) ABSTRACT

In an aspect, a negative active material, a method of preparing the negative active material, and a lithium battery including the negative active material are provided. The method of preparing the negative active material may increase pulverizing efficiency in pulverizing a silicon-based bulky particle into a nano-size silicon-based primary particle and decrease a capacity loss of the obtained negative active material. The nano-size negative active material has excellent crystalline characteristics, high capacity, and high initial efficiency, due to a decrease in surface oxidation and surface damage.

10 Claims, 5 Drawing Sheets

(51) Int. Cl.
  *H01M 4/36* (2006.01)
  *H01M 4/583* (2010.01)
  *H01M 4/1395* (2010.01)
  *H01M 4/62* (2006.01)

(52) U.S. Cl.
  CPC .......... *Y02E 60/122* (2013.01); *Y10T 428/2982* (2015.01)

(56) References Cited

U.S. PATENT DOCUMENTS

2011/0183202 A1* 7/2011 Lee et al. ................... 429/212
2011/0256452 A1* 10/2011 Cho et al. ................. 429/218.1
2013/0052533 A1* 2/2013 Chun et al. ............... 429/218.1

FOREIGN PATENT DOCUMENTS

KR 10-2004-0103753 (A) 12/2004
KR 10-2005-0086647 (A) 8/2005
KR 10-2009-0067769 (A) 6/2009

OTHER PUBLICATIONS

J.-S. Byun et al., "Influence of stearic acid on mechanochemical reaction between Ti and BN powders," *Journal of Alloys and Compounds* 365 (2004) 149-156.

V. Švrček et al., "Unaggregated silicon nanocrystals obtained by ball milling," *Journal of Crystal Growth* 275 (2005) 589-597.

* cited by examiner

NEGATIVE ACTIVE MATERIAL, METHOD OF MANUFACTURING THE SAME, AND LITHIUM BATTERY INCLUDING THE NEGATIVE ACTIVE MATERIAL

CROSS-REFERENCE TO RELATED APPLICATIONS

This application claims priority to and the benefit of Korean Patent Application No. 10-2012-0113028 filed on Oct. 11, 2012, in the Korean Intellectual Property Office, the disclosure of which is incorporated in its entirety herein by reference.

BACKGROUND

1. Field

This disclosure relates to a negative active material, a method of preparing the same, and a lithium battery including the negative active material.

2. Description of the Related Technology

Lithium secondary batteries are used in portable electronic devices for mobile communication, such as personal digital assistants (PDAs), mobile phones, notebook computers, electric bicycles, or electric vehicles, and have twice or more the discharge voltage than conventional batteries, and may have high energy density.

Lithium secondary batteries produce electrical energy by oxidation and reduction reactions that occur when lithium ions are intercalated to or deintercalated from a positive electrode and a negative electrode, said positive electrode and negative electrode each including an active material that enables the intercalation and deintercalation of lithium ions, and having an organic electrolyte or a polymer electrolyte filled therebetween.

A positive active material, for example, an oxide that consists of lithium and a transition metal and has a structure enabling intercalation of lithium ions may be used in a lithium secondary battery. Examples of an oxide that may be used as a positive active material include, but are not limited to, lithium cobalt oxide ($LiCoO_2$), lithium nickel oxide ($LiNiO_2$), and lithium nickel cobalt manganese oxide ($Li[NiCoMn]O_2$, $Li[Ni_{1-x-y}Co_xM_y]O_2$).

A typical negative active material that is used in a lithium secondary battery are carbonaceous materials, such as an artificial and natural graphite or hard carbon.

Non-carbonaceous materials may have a capacity density that is 10 times greater than that of graphite. Thus, non-carbonaceous materials have been recently investigated as a negative active material for lithium secondary batteries. However, their volumetric swelling or shrinkage during charging and discharging of a lithium battery may lead to a decrease in capacity retention ratios, charging/discharging efficiency, and lifespan characteristics. Accordingly, there are limitations to using known carbonaceous and non-carbonaceous materials as high-performance negative active materials for lithium batteries. Therefore, there is a need to develop superior negative active materials for lithium batteries with improved capacity characteristics and cycle lifespan characteristics.

SUMMARY

Some embodiments provide a negative active material including nano-size primary particles with high capacity and initial efficiency.

Some embodiments provide a method of manufacturing the negative active material.

Some embodiments provide a lithium battery including the negative active material.

Additional aspects will be set forth in part in the description which follows and, in part, will be apparent from the description, or may be learned by practice of the presented embodiments.

Some embodiments provide a negative active material including a silicon-based primary particle that is composed of crystalline silicon having a Raman shift range of about 500 to about 510 $cm^{-1}$ measured by Raman spectroscopy and that have an average particle size of about 100 to about 500 nm.

In some embodiments, the silicon-based primary particle includes a material selected from Si, SiOx (0<x<2), Si—Z alloy (where Z is alkali metal, alkali earth metal, a Group 13 element, a Group 14 element, a Group 15 element, a Group 16 element, a transition metal, a rare earth element, or a combination thereof, and is not Si), and a combination thereof.

Some embodiments provide a negative active material for a rechargeable lithium battery including surface modified silicon-based primary particles, said particles comprising a surface. In some embodiments, the surface modified silicon-based primary particles may include an amorphous carbonaceous coating layer formed on silicon-based primary particles. In some embodiments, the amorphous carbonaceous coating layer may include a carbonized material, where the carbonized material may be made from an organic material selected from sucrose, glucose, galactose, fructose, lactose, starch, mannose, ribose, aldohexose, ketohexose, and a combination thereof.

In some embodiments, an amount of the amorphous carbonaceous coating layer may be in a range of about 1 to about 10 parts by weight based on 100 parts by weight of the silicon-based primary particle.

In some embodiments, the amorphous carbonaceous coating layer may have a thickness of about 1 to about 100 nm.

In some embodiments, a capacity of the negative active material may be 3000 mAh/g or more. For example, a capacity of the negative active material may be in a range of about 3000 to about 3500 mAh/g.

Some embodiments provide a method of preparing a negative active material, said method including: preparing a mixture comprising a silicon-based bulky particle and an emulsifier in an organic solvent; and pulverizing the mixture by using a milling process, followed by drying.

In some embodiments, the silicon-based bulky particles may include a material selected from Si, SiOx (0<x<2), Si—Z alloy (where Z is alkali metal, alkali earth metal, a Group 13 element, a Group 14 element, a Group 15 element, a Group 16 element, a transition metal, a rare earth element, or a combination thereof, and is not Si), and a combination thereof.

In some embodiments, the emulsifier may include at least one selected from the group consisting of stearic acid, palmitic acid, oleic acid, lauric acid, tridecylic acid, pentadecanoic acid, myristic acid, nonadecanic acid, arachic acid, behenic acid, linolic acid, linolenic acid, and glycerin. In some embodiments, an amount of the emulsifier may be in a range of about 1 to about 30 parts by weight based on 100 parts by weight of the silicon-based bulky particle.

In some embodiments, the mixture may further include an organic material selected from sucrose, glucose, galactose, fructose, lactose, starch, mannose, ribose, aldohexose, ketohexose, and a combination thereof.

In some embodiments, the organic solvent may be selected from ethanol, n-butanol, 1-propanol, 2-propanol, and a combination thereof, and an amount of the organic solvent is in a range of about 100 to about 300 parts by weight based on 100 parts by weight of the silicon-based bulky particle.

In some embodiments, the milling process may be performed with a bead mill, a ball mill, a high energy ball mill, a planetary mill, a stirred ball mill, or a vibration mill.

In some embodiments, the drying may be performed under reducing conditions, and the drying may be performed at a temperature of about 60 to about 150° C.

Some embodiments provide a lithium battery including: a negative electrode, said negative electrode comprising the negative active material; a positive electrode, said positive electrode comprising a positive active material and which is configured to face the negative electrode; and an electrolyte interposed between the negative electrode and the positive electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
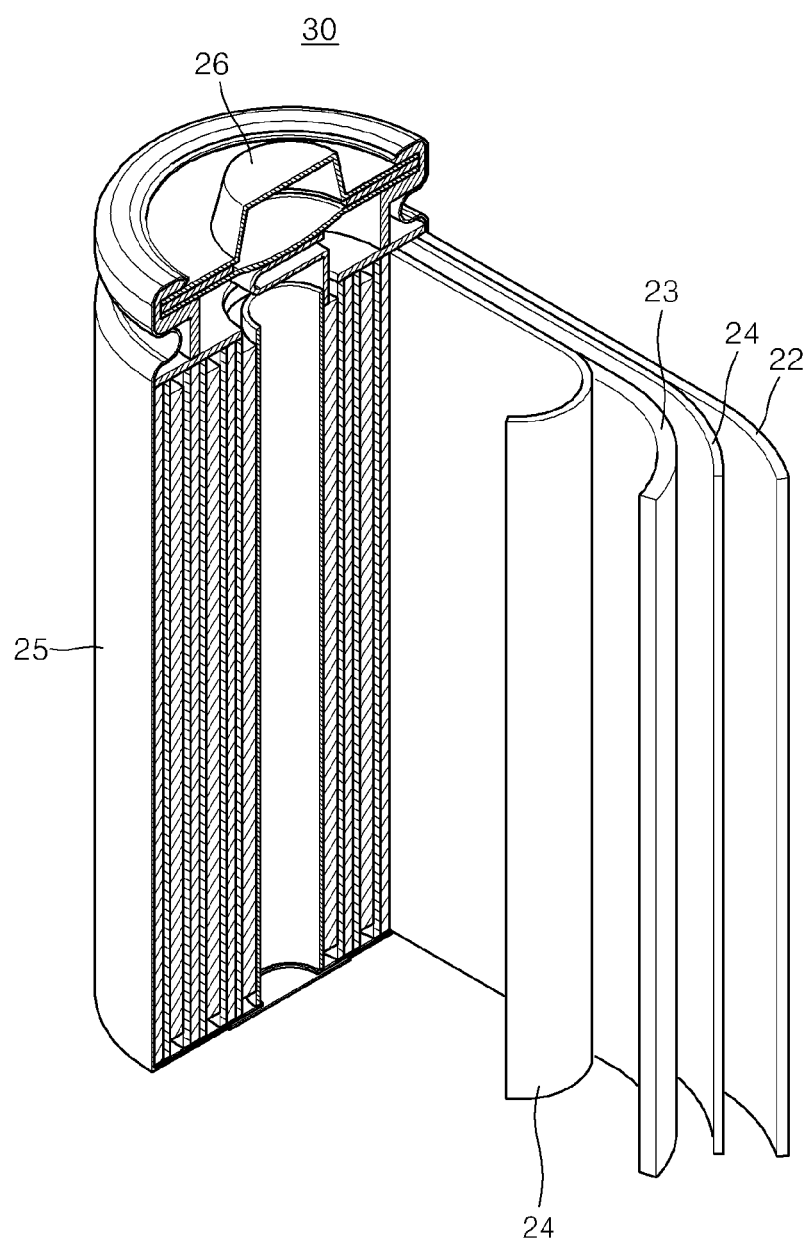
FIG. 1 is a schematic view of a lithium battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, embodiments of the present disclosure are described in detail.

It has been shown that when nano-size silicon particles are applied to a battery, the battery may have excellent lifespan characteristics, as compared to a battery including bulky silicon particles.

However, when silicon particles are reduced in size to nano-scale by a mechanical process, a lattice thereof may be deformed due to mechanical stress during milling, and thus, amorphization of a crystal lattice proceeds. In addition, the increase in specific surface area due to the decrease in size may lead to formation of an oxide layer due to absorption of moisture. Accordingly, it is difficult to obtain a theoretical capacity of 4200 mAh/g when using nano-size silicon particles in a battery.

Some embodiments provide a negative active material including silicon-based primary particles that are composed of crystalline silicon having a Raman shift range of about 500 to about 510 $cm^{-1}$ as measured by Raman spectroscopy and which have an average particle size of about 100 to about 500 nm, said particles comprising a surface. In contrast to silicon particles obtained by typical mechanical processes, the negative active material may have a high capacity of 3000 mAh/g or more. In some embodiments, the silicon-based primary particles may have an average particle size of about 100 to about 500 nm. In some embodiments, the silicon-based primary particles may have an average particle size of about 150 to about 450 nm.

In some embodiments, the silicon-based primary particle may include a material selected from Si, $SiO_x$ ($0<x<2$), Si—Z alloy (where Z is alkali metal, alkali earth metal, a Group 13 element, a Group 14 element, a Group 15 element, a Group 16 element, a transition metal, a rare earth element, or a combination thereof, and is not Si), and a combination thereof. In some embodiments, the element Z may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. Such silicon materials, such as Si, $SiO_x$, or Si—Z alloy, may be easily formed into nanoparticles by a milling process, such as a bead mill, a ball mill process, etc.

In some embodiments, the silicon-based primary particles may be composed of crystalline silicon having a Raman shift range of about 500 to about 510 $cm^{-1}$ measured by Raman spectroscopy and may have an average particle size of about 100 to about 500 nm. In some embodiments, the silicon-based primary particles may have an average particle size of about 150 to about 450 nm.

The Raman peak of the crystalline silicon forming the silicon-based primary particle is distinctive from that of crystalline silicon having the same above-described particle size range obtained by a conventional mechanical pulverizing process. A silicon particle having the same above-described average particle size range obtained by a conventional mechanical pulverizing process may be composed of amorphous silicon and crystalline silicon. Due to the co-existence of the amorphous and crystalline silicon in particles obtained by a conventional mechanical pulverizing process, a Raman shift of amorphous silicon may appear in a range of 500 $cm^{-1}$ or less. Also, a silicon particle obtained by a conventional mechanical pulverizing process may be composed of non-uniformed crystalline silicon having various particle sizes, and thus, Raman peaks randomly appear in a range of about 490 to 516 $cm^{-1}$.

In some embodiments, a nano-size crystalline silicon having a uniform particle size distribution may be obtained by pulverizing with an emulsifier, which will be described in detail.

According to an embodiment, the silicon-based primary particles may have an amorphous carbonaceous coating layer on the surface. In some embodiments, the silicon-based primary particles may have an amorphous carbonaceous coating layer on the surface to provide coated silicon-based primary particles. In some embodiments, the coated silicon-based primary particles may have an average particle size of about 110 to about 600 nm. In some embodiments, the coated silicon-based primary particles may have an average particle size of about 150 to about 500 nm.

In some embodiments, the amorphous carbonaceous coating layer may be formed of carbonized material, where the carbonized material may be made an organic material, for example, a carbonized material made of an organic material selected from sucrose, glucose, galactose, fructose, lactose, starch, mannose, ribose, aldohexose, ketohexose, and a combination thereof.

In some embodiments, the organic material may be dissolved in an organic solvent, such as alcohol. For example, the organic material may be uniformly distributed on surfaces of a nano-size silicon-based particle when such an organic material is additionally used during when a silicon-based bulky particle is pulverizing together with an emulsifier in an organic solvent, and then, the pulverized product mixture is dried. Thereafter, the resulting mixture may be heat treated so that the organic material is carbonized to form a continuous amorphous carbonaceous coating layer on the surface of the silicon-based primary particle.

In some embodiments, the amorphous carbonaceous coating layer may form a conductive path in the negative active material to improve electric conductivity of the negative active material. Accordingly, the negative active material, including the amorphous carbonaceous coating layer, may not require a conductive agent at all, or when such a negative active material is used, the use of a conductive agent may be minimized. Accordingly, a capacity per unit volume increases and thus, a high capacity may be embodied.

In some embodiments, the amorphous carbonaceous coating film may be uniform and continuous on surfaces of the silicon-based primary particles.

In some embodiments, an amount of the amorphous carbonaceous coating layer may be in a range of about 1 to about 10 parts by weight based on 100 parts by weight of the silicon-based primary particle. For example, an amount of the amorphous carbonaceous coating layer may be in a range of about 2 to about 8 parts by weight based on 100 parts by weight of the silicon-based primary particle. For example, an amount of the amorphous carbonaceous coating layer may be in a range of about 4 to about 6 parts by weight based on 100 parts by weight of the silicon-based primary particle. When the amount of the amorphous carbonaceous coating layer is within such ranges, electric conductivity of a lithium battery may be improved while a conductive path between silicon-based primary particles with relatively low electric conductivity is maintained.

In some embodiments, the first amorphous carbonaceous coating layer may be formed with an appropriate thickness as long as the first amorphous carbonaceous coating layer provides a sufficient conductive path and does not inhibit a capacity of a formed battery. For example, a thickness of the first amorphous carbonaceous coating film may be in a range of about 0.5 to about 150 nm, for example, about 1 to about 100 nm, and for example, about 10 to about 100 nm. However, the thickness of the first amorphous carbonaceous coating film is not limited thereto.

According to an embodiment, the negative active material may further include a crystalline carbonaceous material together with the silicon-based primary particle. When the crystalline carbonaceous material is mixed with the silicon-based primary particle and the mixture is applied to the negative active material, a capacity and cycle characteristics of a lithium battery may be improved.

In some embodiments, the crystalline carbonaceous material may have a crystalline plate structure. As used herein the term "plate structure" is a 2-dimensional bent, curled, or partially defected structure.

In some embodiments, the crystalline carbonaceous material may include a material selected from a polycyclic nano-sheet containing carbon atom rings that are condensed to each other and arranged on the same plane, a stack of polycyclic nano-sheets, graphite, and a combination thereof. In some embodiments, the polycyclic nano-sheet may be, for example, graphene. In some embodiments, the stack of polycyclic nano-sheets may be, for example, a stack of 2 to 50 polycyclic nano-sheets. In some embodiments, the, the stack of polycyclic nano-sheets may be partially swollen in advance for use as the crystalline carbonaceous material.

An amount of the crystalline carbonaceous material may be, for example, in a range of about 75 to about 95 parts by weight based on 100 parts by weight of the silicon-based primary particles.

According to an embodiment, the negative active material may further include a second amorphous carbonaceous coating layer on the surface of a secondary particle obtained by blending the silicon-based primary particle and the crystalline carbonaceous material. In some embodiments, the second amorphous carbonaceous coating layer may include a material selected from soft carbon (cold calcined carbon), hard carbon, pitch carbide, mesophase pitch carbide, fired cork, and a combination thereof.

In some embodiments, the second amorphous carbonaceous coating layer may be formed as follows: for example, silicon-based primary particles obtained by mechanically pulverizing with organic materials may be spherized to form a secondary particle of a spherical shape, and a surface of the spherical secondary particles are coated with a carbon precursor, such as a coal-based pitch, a mesophase pitch, a gasoline-based pitch, coal-based oil, gasoline-based middle crude oil, an organic synthetic pitch, or a polymer resin, such as a phenol resin, a furan resin, a polyimide resin, etc. and then, heat treated under an inert atmosphere, such as an argon or nitrogen atmosphere. Through one heat treatment, the second amorphous carbonaceous coating layer may be obtained by carbonization of the carbon precursor on a spherical secondary particle while the amorphous carbonaceous coating layer is formed on the silicon-based primary particle by carbonization of organic materials. According to another embodiment, the second amorphous carbonaceous coating layer may be formed by coating the carbon precursor on a secondary particles, which may already have the amorphous carbonaceous coating layer thereon, and heat treating the resulting mixture.

According to an embodiment, an average particle size of the secondary particle of the negative active material may be 50 μm maximum. In contrast, when the average particle size of the secondary particle is greater than 50 μm, characteristics according to an increase in a charging and discharging rate may be degraded. In some embodiments, an average particle size of the secondary particle may be in a range of about 5 to about 30 μm, for example, in a range of about 10 to about 20 μm.

According to an embodiment, a capacity of the negative active material may be 3000 mAh/g or more. In some embodiments, the capacity of the negative active material may be in a range of 3000 to 3500 mAh/g. This capacity range is distinctive from that of nano-size silicon particles obtained by using a conventional pulverizing method, and the formation of amorphous negative active material due to surface oxidation and/or surface damage may be suppressed and thus, a crystallinity of the negative active material improves and capacity and initial efficiency thereof may increase.

Some embodiments provide a method of preparing a negative active material including: mixing a silicon-based bulky particles and an emulsifier in an organic solvent to provide a mixture; and pulverizing the mixture by using a milling process, optionally followed by drying to provide a dried mixture. In some embodiments, the method may further comprise adding a crystalline carbonaceous material to the dried mixture to provide a resultant mixture and spherizing the resultant mixture to provide a resultant spherical mixture; and heat treating the resultant spherical mixture. In some embodiments, the heat treating may be performed at a temperature of from about 700 to about 1000° C.

In some embodiments, the silicon-based bulky particles may be a starting material for forming a silicon-based primary particles, and may be composed of a material selected from the group consisting of Si, SiOx (0<x<2), Si—Z alloy (wherein Z is alkali metal, alkali earth metal, a Group 13 element, a Group 14 element, a Group 15 element, a Group 16 element, a transition metal, a rare earth element, or a combination thereof, and is not Si), and a combination thereof. In some embodiments, Z may be at least one material selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B (boron), Ge, P (phosphorus), As, Sb, Bi, S, Se, Te, and Po. In some embodiments, Z may be a combination of two or more materials selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B (boron), Ge, P (phosphorus), As, Sb, Bi, S, Se, and Te.

When the silicon-based bulky particle is pulverized by using a wetting method with an emulsifier, the emulsifier may cover the nano-sized pulverized particle to prevent aggregation of the particles, and also, the silicon-based bulky particle and nano particle may be uniformly dispersed in a mixed solution, thereby enabling impact to be uniformly applied and increasing pulverizing efficiency.

In some embodiments, the emulsifier may include at least one selected from the group consisting of stearic acid, palmitic acid, oleic acid, lauric acid, tridecylic acid, pentadecaic acid, myristic acid, nonadecanic acid, arachic acid, behenic acid, a linolic acid, linolenic acid, and glycerin. For example, stearic acid, palmitic acid, oleic acid, glycerin, or the like may be used as the emulsifier. These emulsifiers may be used alone, or two or more of these may be used together.

An amount of the emulsifier is not limited, and to promote dispersion of silicon-based bulky particles and milled nano particles so as to increase milling efficiency, an amount of the emulsifier may be in a range of about 1 to about 30 parts by weight based on 100 parts by weight of silicon-based bulky particles. For example, an amount of the emulsifier may be in a range of about 1 to about 10 parts by weight based on 100 parts by weight of silicon-based bulky particles.

As the organic solvent, any of various media that may disperse the silicon-based bulky particles and the emulsifier may be used. For example, an alcohol, such as ethanol, n-butanol, 1-propanol, or 2-propane, may be used. In some embodiments, the amount of the organic solvent may be in a range of 100 to 300 parts by weight based on 100 parts by weight of the silicon-based bulky particles.

In some embodiments, the emulsifier may improve dispersion characteristics of the silicon-based bulky particle, and may also reduce a pulverizing time, compared to when the emulsifier is not used, when the silicon-based bulky particle is pulverized to a nano-size.

Typically, to obtain a silicon particle having a relatively sharp distribution curve, a bulky particle is pulverized in a top-down manner according to sizes of beads or balls. That is, a relatively large bead or ball is used, and then, as a size of a bulky particle is reduced, a smaller bead or ball is sequentially used to obtain a nano-size silicon particle. However, this pulverizing method requires a long process time, and a great amount of oxide may be formed on surfaces of silicon. In addition, even when a small bead or ball is used from the start to proceed the milling process at once, a decrease in a process time may not be obtained, and a capacity of a lithium battery may be decreased due to oxidation of silicon and an amorphous property of a crystal. However, as in an embodiment, when silicon-based bulky particle is pulverized with the emulsifier, dispersion property of the particle may be improved and a milling time is reduced. Thus, surface damage and surface oxidation may be prevented as much as possible, and thus, crystallinity may be improved.

In some embodiments, the mixture may further include, together with the silicon-based bulky particles and the emulsifier, an organic material selected from the group consisting of sucrose, glucose, galactose, fructose, lactose, starch, mannose, ribose, aldohexose, ketohexose, and combinations thereof. When silicon-based bulky particles are pulverized by, for example, ball milling, the organic material may be uniformly distributed on the surface of the silicon-based particles pulverized to a nano-size, thereby forming a carbonated coating layer obtained by calcination.

In some embodiments, the milling process may be performed with a bead mill, a ball mill, a high energy ball mill, a planetary mill, a stirred ball mill, a vibration mill, or the like. In some embodiments, the bead mill and the ball mill may be formed of a chemically inactive material that does not react with silicon and organic materials, and may be formed of, for example, a zirconia material. Sizes of beads and balls in the bead mill or ballmill may be in a range of, for example, about 0.1 to about 1 mm, but are not limited thereto.

In some embodiments, a milling process time may vary according to a size of the silicon-based bulky particle, a size of a desired final primary particle, and a size of bead and ball in the bead mill and the ball mill used in a milling process. For example, the milling process time may be in a range of about 0.5 to about 20 hours.

In some embodiments, a product obtained from the milling process may be dried to remove the organic solvent therefrom. In some embodiments, the drying may be performed in a temperature range in which the organic solvent may be dried or evaporated, and for example, may be performed in a range of about 60 to about 150° C. In addition, to suppress surface-oxidation of the nano-size particle, the drying may be performed under reducing conditions, such as in an argon or nitrogen atmosphere.

In some embodiments, the Silicon-based primary particles obtained by the pulverizing and drying, as described above, may have a uniform emulsifier coating layer on its surface, and due to a decrease in surface damage, the silicon-based primary particles may have excellent crystallinity and excellent initial efficiency. For example, an initial capacity of the silicon-based primary particle may be 3000 mAh/g.

According to an embodiment, to further improve conductivity of the negative active material, a crystalline carbonaceous material may be further added to the dried mixture including the silicon-based primary particle. In some embodiments, the crystalline carbonaceous material has a crystalline plate structure, and may include a material selected from the group consisting of a polycyclic nano-sheet including carbon atom rings that are condensed with each other to be arranged on a plane, a stack of the polycyclic nano-sheets, graphite, and a combination thereof. In some embodiments, the polycyclic nano-sheet may be, for example, graphene. In some embodiments, the stack of polycyclic nano-sheets may be, for example, a stack of 2 to 50 polycyclic nano-sheets. As the crystalline carbonaceous material, the stack of polycyclic nano-sheets may be partially swollen in advance for use.

In some embodiments, the amount of the crystalline carbonaceous material may be in a range of about 50 to about 95 parts by weight based on 100 parts by weight of the mixture.

According to an embodiment, the secondary particle obtained by mixing a plurality of silicon-based primary particles and a crystalline carbonaceous material may be further surface-coated with a carbon precursor, such as a coal-based pitch, a mesophase pitch, a gasoline-based pitch, coal-based oil, gasoline-based middle crude oil, an organic synthetic pitch, or a polymer resin, such as a phenol resin, a furan resin, or a polyimide resin, and then, the coating result is heat treated.

In some embodiments, the heat treatment may be performed in a range of about 700 to about 1000° C. In addition, to prevent surface oxidation of silicon-based primary particles due to oxygen existing between particles, the heat treatment may be performed under reducing conditions, such as in an argon or nitrogen atmosphere.

A negative active material prepared by using the method of preparing a negative active material as described above may have a high capacity and excellent cycle characteristics.

Some embodiments provide a lithium battery including a negative electrode, said negative electrode including the negative active material described above; a positive electrode, said positive electrode including a positive active material which is configured to face the negative electrode; and an electrolyte interposed between the negative electrode and the positive electrode.

In some embodiments, the negative electrode may include the negative active material described above, and may be manufactured, for example, as follows: the negative active material, a binder and selectively, a conductive agent are mixed in a solvent to prepare a negative active material composition, and then, the negative active material composition may be formed in a predetermined shape, or may be applied on a negative current collector, such as a copper foil.

In some embodiments, the binder used in the negative active material composition may aid binding of an active material with a conductive agent and binding of an active material with a current collector, and an amount of the binder may be in a range of about 1 to about 50 parts by weight based on 100 parts by weight of the negative active material. Examples of the binder are polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene propylene diene terpolymer (EPDM), sulfonated EPDM, styrene butadiene rubber, fluoro rubber, and various copolymers.

In some embodiments, the negative electrode may not include a conductive agent because the negative active material itself provides a conductive path. However, to further improve electric conductivity, selectively, the negative electrode may selectively include a conductive agent. As the conductive agent, any one of various materials that are typically used in a lithium battery may be used, and examples of the conductive agent may include a carbonaceous material, natural graphite, artificial graphite, carbon black, acetylene black, Ketjen black, or carbon fiber, a metal-based material, such as powder or fiber of copper, nickel, aluminum, or silver, a conductive polymer, such as polyphenylene derivatives, and a mixture thereof. An amount of the conductive agent may be appropriately controlled.

As the solvent, N-methylpyrrolidone (NMP), acetone, water, or the like may be used. In some embodiments, the amount of the solvent may be in a range of 1 to 10 parts by weight based on 100 parts by weight of the negative active material. When the amount of the solvent is within this range, the positive active material may be easily formed.

In some embodiments, the negative current collector may be formed in a thickness of about 5 to about 20 μm. In some embodiments, the negative current collector may not be particularly limited as long as it does not cause any chemical change in a secondary battery and has conductivity, and examples of a material for forming the negative current collector are copper, stainless steel, aluminum, nickel, titanium, calcined carbon, and copper or stainless steel that is surface treated with carbon, nickel, titanium, silver, and an aluminum-cadmium alloy. In addition, a fine uneven structure may be formed on the negative current collector to increase a binding force with respect to an electrode active material, and the negative current collector may have various shapes, such as a film, a sheet, a foil, a net, porosity, a foam, or a non-woven shape.

In some embodiments, the prepared negative active material composition may be directly coated on the negative current collector to prepare a negative electrode plate. In some embodiments, the prepared negative active material composition may be casted onto a separate support and a negative active material film exfoliated from the support may be laminated on a copper foil current collector to obtain a negative electrode plate. The negative electrode may also be formed by using other methods.

In addition to the use in preparing an electrode, the negative active material composition may also be printed on a flexible electrode plate to manufacture a printable battery.

Separately, a positive active material composition, including a positive active material, a conductive agent, a binder, and a solvent, is prepared to manufacture a positive electrode.

As the positive active material, any one of various lithium-containing metal oxides that are typically used in the art may be used. For example, $LiCoO_2$, $LiMn_xO_{2x}$ (x=1, 2), $LiNi_{1-x}Mn_xO_2$ (0<x<1), or $LiNi_{1-x-y}Co_xMn_yO_2$ (0≤x≤0.5, 0≤y≤0.5) may be used. For example, a compound enabling intercalation/deintercalation of lithium, such as $LiMn_2O_4$, $LiCoO_2$, $LiNiO_2$, $LiFeO_2$, $V_2O_5$, TiS, or MoS may be used.

In some embodiments, the conductive agent, the binder, and the solvent included in the positive active material composition may be the same as those used in the negative active material composition. According to some embodiments of the present disclosure, a plasticizer may be further included in the positive active material composition and the negative active material composition to form pores in an electrode plate. Amounts of the positive active material, the conductive agent, the binder, and the solvent may be the same as used in a typical lithium battery.

In some embodiments, a positive current collector may have a thickness of about 10 to 20 μm and may not be particularly limited as long as it does not cause any chemical change in a battery and has conductivity, and examples of a material for forming the positive current collector are stainless steel, aluminum, nickel, titanium, calcined carbon, and aluminum or stainless steel that is surface treated with carbon, nickel, titanium, or silver. In addition, a fine uneven structure may be formed on the negative current collector to increase a binding force with respect to an electrode active material, and the negative current collector may have various shapes, such as a film, a sheet, a foil, a net, a porous structure, a foam, or a non-woven shape.

In some embodiments, the prepared positive active material composition may be directly coated and dried on a positive electrode current collector to prepare a positive electrode plate. According to another embodiment of the present disclosure, the positive active material composition may be casted onto a separate support, and a film exfoliated from the support is laminated on a positive electrode current collector to prepare a positive electrode plate.

In some embodiments, the positive electrode and the negative electrode may be separated by a separator. In some embodiments, the separator may be any one of various separators that are used in a typical lithium battery. For example, a material that has low resistance to ion migration of an electrolyte and has excellent electrolytic solution retaining capability is suitable for a material for forming the separator. In some embodiments, the separator forming material may be selected from glass fiber, polyester, polyethylene, polypropylene, polytetrafluoroethylene (PTFE), and a combination thereof, each of which may be in a non-woven fabric or woven fabric form. In some embodiments, the separator may have a pore size of about 0.01 to about 10 µm, and a thickness of about 5 to about 300 µm.

A lithium salt-containing non-aqueous electrolyte is composed of a non-aqueous electrolyte and lithium salt. In some embodiments, the non-aqueous electrolyte may be a non-aqueous electrolytic solution, an organic solid electrolyte, or an inorganic solid electrolyte.

An example of the non-aqueous electrolytic solution is an aprotic solvent, and examples of the aprotic solvent as the non-aqueous electrolytic solution are N-methyl-2-pyrrolidinone, propylene carbonate, ethylene carbonate, butylene carbonate, dimethyl carbonate, diethyl carbonate, gamma butyrolactone, 1,2-dimethoxy ethane, tetrahydrofuran, 2-methyl tetrahydrofuran, dimethyl sulfoxide, 1,3-dioxorun, formamide, dimethyl formamide, acetonitril, nitromethane, methyl formate, methyl acetate, triester phosphate, trimethoxymethane, dioxorun derivative, sulfolane, methyl sulfolane, 1,3-dimethyl-2-imidazolidinone, propylene carbonate derivative, tetrahydrofuran derivative, ether, methyl propionate, and ethyl propionate.

Examples of the organic solid electrolyte are a polyethylene derivative, a polyethylene oxide derivative, a polypropylene oxide derivative, a phosphate ester polymer, poly agitation lysine, polyester sulfide, polyvinyl alcohol, poly fluoro vinylidene, an ionic decomposer-containing polymer.

Examples of the inorganic solid electrolyte are nitrides, halides, and sulfates, and silicates of Li, such as $Li_3N$, $LiI$, $Li_5NI_2$, $Li_3N$-$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

In some embodiments, the lithium salt may be any one of various materials that are typically used in a lithium battery, and as a material that is easily dissolved in the non-aqueous electrolyte. In some embodiments, at least one of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, lithium chloroborate, low aliphatic lithium carbonate, 4-phenyl lithium borate, and imide may be used as the lithium salt.

The lithium battery according to an embodiment of the present disclosure may be a lithium ion battery, a lithium ion polymer battery, and a lithium polymer battery, which are classified according to a separator and an electrolyte, and may also be a cylindrical battery, a rectangular battery, a coin-shape battery, and a pouch-shape battery, which are classified according to the shape of a battery, and may also be a bulky battery and a thin film type battery, which are classified according to the size of a battery.

In some embodiments, the lithium battery may also be a lithium primary battery and a lithium secondary battery.

FIG. 1 is a schematic view of a secondary lithium battery 30 according to an embodiment of the present disclosure.

Referring to FIG. 1, the secondary lithium battery 30 includes a positive electrode 23, a negative electrode 22, and a separator 24 interposed between the positive electrode 23 and the negative electrode 22. In some embodiments, the positive electrode 23, the negative electrode 22, and the separator 24 are wound or folded to be placed in a battery case 25. Subsequently, an electrolyte is injected into the battery case 25, which is then sealed with a sealing member 26, thereby completing the manufacturing of the secondary lithium battery 30. In some embodiments, the battery case 25 may have a cylindrical, rectangular, and thin-film shape. In some embodiments, the secondary lithium battery may be a lithium ion battery.

The lithium battery may be suitable for, in addition to mobile phones and portable computers, applications requiring high capacity, high performance, and high-temperature driving, such as electric vehicles. In addition, the lithium battery may be combined with a typical internal combustion engine, a fuel battery, or a super capacitor for use in hybrid vehicles.

In addition, the lithium battery may be combined with a typical internal combustion engine, a fuel battery, or a super capacitor for use in hybrid vehicles.

Exemplary embodiments of the present disclosure are described in detail with reference to examples below.

However, the present embodiments are not limited to the exemplary embodiments.

Preparation of Si Nanoparticle Powder

EXAMPLE 1

Si particles were pulverized with a bead mill to prepare nano-size particles. 30 wt % Si particles (325 mesh; Aldrich, St Louis Mo.) and 1 wt % stearic acid were mixed in an isopropanol solvent, and then, the mixed solution was milled with zirconia beads (0.3 mm size) at a beads rotation speed of 4000 rpm for 6 hours. The milled Si nanoparticles colloid mixture was dried at a temperature of 120° C. under reducing conditions in a drying furnace for 2 hours. Subsequently, the dried powder was milled in a mortar, and then sieved with a 325 mesh to obtain a Si nanoparticle powder including particles having an average particle size of about 300 nm.

EXAMPLE 2

Si nanoparticle powder including particles having an average particle size of about 200 nm was obtained in the same manner as in Example 1, except that the milling time was 8 hours.

EXAMPLE 3

Si nanoparticle powder including particles having an average particle size of about 100 nm was obtained in the same manner as in Example 1, except that the milling time was 12 hours.

COMPARATIVE EXAMPLE 1

30 wt % Si particles (Aldrich, 325 mesh) was mixed with an isopropanol solvent, and then, the result solution was milled with zirconia beads (0.3 mm size) at a beads rotation speed of 4000 rpm for 6 hours.

The milled Si nanoparticles colloid mixture was dried at a temperature of 120° C. under reducing conditions in a drying furnace for 2 hours. Subsequently, the dried powder was milled in a mortar, and then sieved with a 325 mesh to obtain Si nanoparticle powder including particles having an average particle size of about 300 nm.

COMPARATIVE EXAMPLE 2

Si nanoparticle powder including particles having an average particle size of about 200 nm was obtained in the same manner as in Comparative Example 1, except that the milling time was 8 hours.

COMPARATIVE EXAMPLE 3

Si nanoparticle powder including particles having an average particle size of about 200 nm was obtained in the same manner as in Comparative Example 1, except that the milling time was 12 hours.

EVALUATION EXAMPLE 1

Particle Size Distribution Analysis

Figure 2:
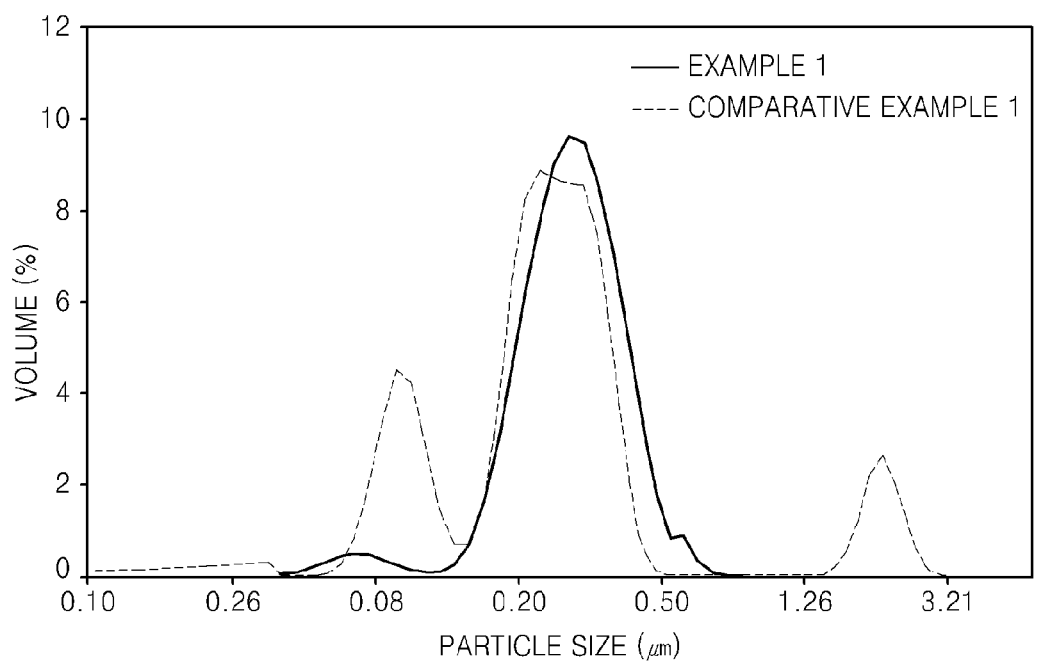
FIG. 2 shows particle size distribution analysis results of a Si nanoparticle powder prepared according to Example 1 and Comparative Example 1.

Particle size distribution of Si nanoparticle powders prepared according to Example 1 and Comparative Example 1 was analyzed with a particle size analyzer, and results thereof are shown in Table 1 and FIG. 2). In addition, from a cumulative distribution curve of particle sizes in which a total volume is indicated as 100%, cumulative average particles corresponding to 10 volume %, 50 volume %, and 90 volume % (respectively referred to as D10, D50, and D90) were measured, and results thereof are shown in Table 1 below.

TABLE 1

|  | Example 1 | Comparative Example 1 |
|---|---|---|
| D10 | 0.18 μm | 0.09 μm |
| D50 | 0.29 μm | 0.24 μm |
| D90 | 0.50 μm | 1.05 μm |

As shown in FIG. 2 and Table 1, Si nanoparticle powder prepared according to Example 1 has a smaller particle size distribution deviation and a sharper particle size distribution curve than that of Comparative Example 1.

EVALUATION EXAMPLE 2

Raman Spectrum Measurement

Raman spectra of Si nanoparticle powders prepared according to Example 1 and Comparative Example 1 were measured to analyze a structure of Si nanoparticle powders so as to identify a crystalline property thereof.

Raman spectrum analysis was performed with a 3D confocal Raman Microscopy System (Nanofinder 30, Tokyo Instruments, Inc, Tokyo Japan). The analysis was performed with diode laser light with a wavelength of 488 nm and a 100-magnification optical lens. Each exposure time was set to 5 seconds. Raman spectrum measurement results of Si nanoparticle powder prepared according to Comparative Example 1 are shown in FIG. 3, and Raman spectrum measurement results of Si nanoparticle powder prepared according to Example 1 are shown in FIG. 4.

Figure 3:
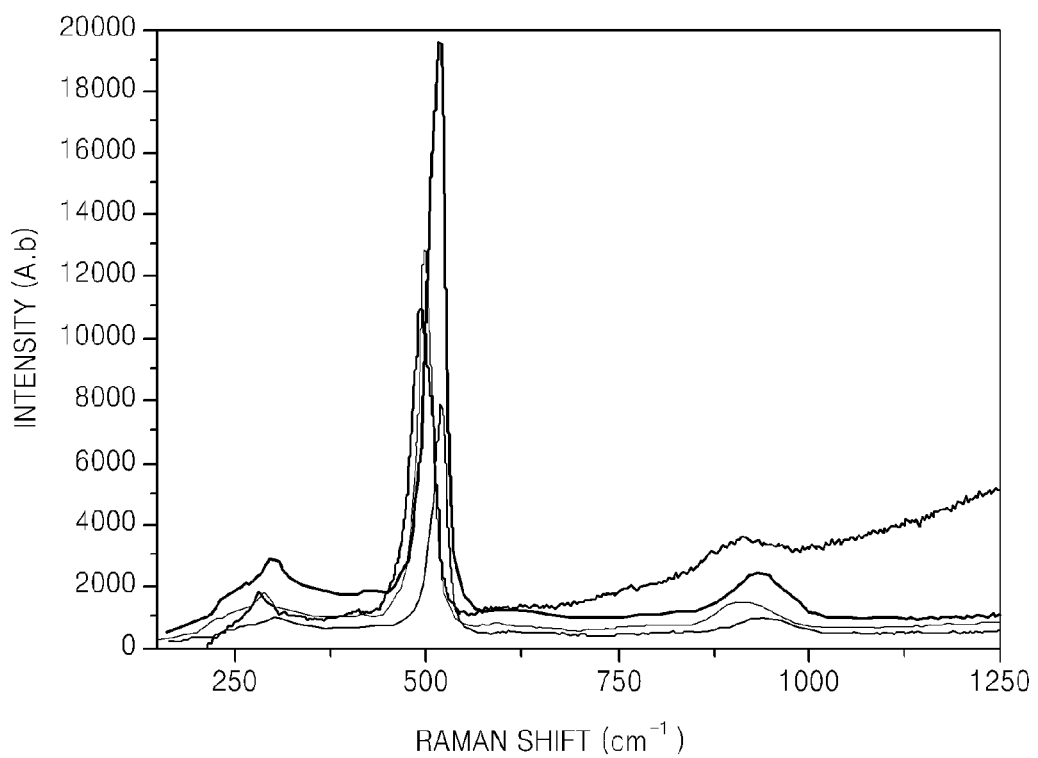
FIG. 3 shows a Raman spectrum of a Si nanoparticle powder prepared according to Comparative Example 1.
Figure 4:
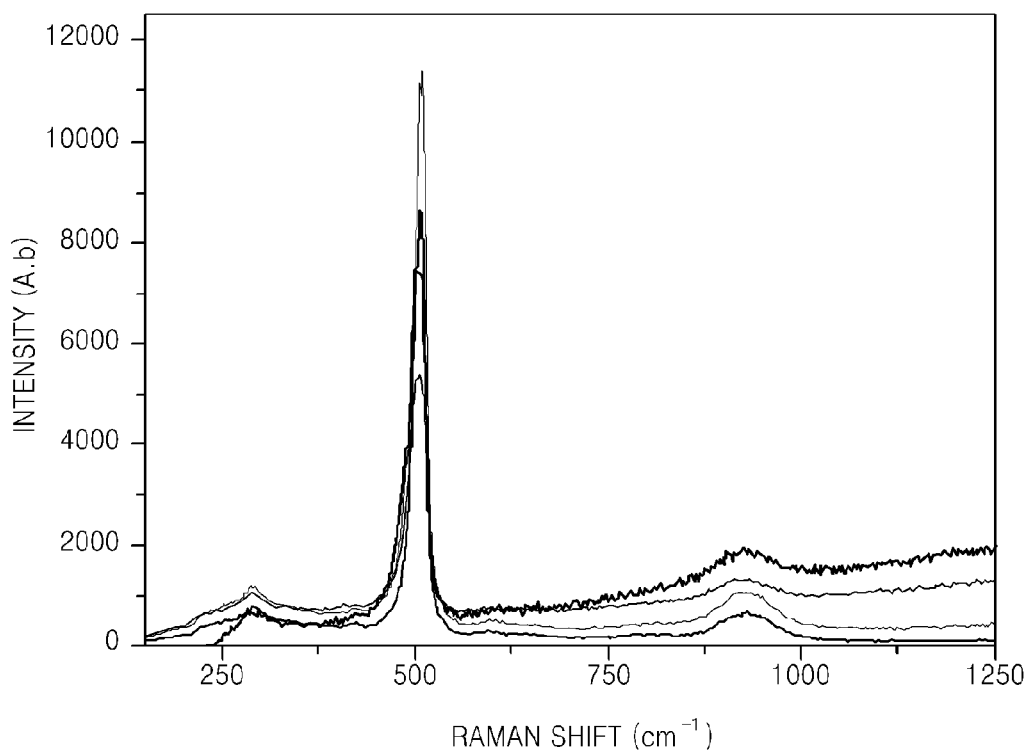
FIG. 4 shows a Raman spectrum of a Si nanoparticle powder prepared according to Example 1.

Referring to FIGS. 3 and 4, a Raman shift of the Si nanoparticle powder obtained by milling without an emulsifier according to Comparative Example 1 appears in a range of about 493 to about 516 $cm^{-1}$, indicating that the Si nanoparticle powder are composed of crystalline phases having various sizes. That is, various peaks appear in, for example, a range of 493 to 497 $cm^{-1}$, at 504 $cm^{-1}$, and at 516 $cm^{-1}$. This is because when the milling was performed without an emulsifier, milling did not occur uniformly and thus, obtained particle sizes are various.

On the other hand, the Si nanoparticle powder obtained by milling with an emulsifier has a Raman shift of 504 to 507 $cm^{-1}$, indicating that the Si nanoparticle powder is composed of a uniform crystalline phase, that is, uniform hexagonal crystalline Si nanoparticles.

EVALUATION EXAMPLE 3

Capacity Evaluation

Coin cells were manufactured with the Si nanoparticle powder prepared according to Examples 1-3 and Comparative Examples 1-3 to evaluate a capacity of the Si nanoparticle powder.

First of all, thin graphite (Japanese graphite product—D50 5 micron, Nippon Graphite Industries, Shiga-ken, Japan) was mixed with each of the Si nanoparticle powder prepared according to Examples 1-3 and Comparative Examples 1-3 at a ratio of 7:3, and then, each of the mixtures was formed in a spherical form by using a Hybridizer (product of Nara Machinery Co., Ltd., Tokyo Japan, Model name: NHS) at a rotation rate of 14500 rpm for 10 minutes, and then, pitch coating was performed with a 10 weight % coal tar pitch. The pitch-coated spherical particles were heat treated at a temperature of 800° C., thereby completing the preparation of a negative active material.

The negative active material and product name LSR7 (manufacturer: Hitachi Chemical, Tokyo Japan; a binder composed of 23 wt % PAI, and 97 wt % N-methyl-2-pyrrolidone), which is a binder, were mixed at a weight ratio of 94:6, and N-methylpyrrolidone was added thereto to control a viscosity thereof such that a solid content of the mixture is 60 wt % to prepare a negative active material slurry. The negative active material slurry was coated on a copper foil current collector having a thickness of 10 μm to manufacture a negative electrode plate, and the coated negative electrode plate was dried at a temperature of 120° C. for 15 minutes, followed by being pressed, to manufacture a negative electrode having a thickness of 60 μm. A counter electrode formed of Li metal was used, a polyethylene separator (product name: STAR20, Asahi Kasei, Tokyo Japan) having a thickness of 20 μm was used, and an electrolytic solution was used, and the result structure is compressed to complete the manufacturing of a 2016R-type semi battery. In this regard, as an electrolyte, 1.10 M $LiPF_6$ dissolved in a mixed solvent, including ethylene carbonate (EC), ethyl methyl carbonate (EMC), and diethyl carbonate (DEC) (a volumetric ratio of EC:EMC:DEC was 3:3:4), was used.

The coin cells were subjected to a formation process, as follows: each of the coin cells manufactured as described above was left to sit at room temperature (25° C.) for 20 hours, 0.01 C cut-off charging was performed on the coin cells at a charging rate of 0.1 C until a voltage reached 0.01V (vs. Li), and then, 1.5 V cut-off discharging was performed on the coin cells at a discharging rate of 0.1 C. Subsequently, the coin cells were repeatedly charged and discharged respectively at charging and discharging rates of 0.2 C (2 cycles) and 0.5 C (50 cycles).

Capacity data under formation conditions of the coin cells are shown in Table 2 below. Initial efficiency is defined as Equation 1.

Initial efficiency [%]=[%]=[discharging capacity in
1st cycle/charging capacity in 1st cycle]×100.   Equation 1

TABLE 2

|  | Si nano powder | Charge (mAh/g) | Discharge (mAh/g) | Initial efficiency (%) | Average efficiency during cycling (%) |
|---|---|---|---|---|---|
| Control | Raw Si | 4059 | 2658 | 65 | 97.7 |
| Example 1 | 300 nm Si | 4026 | 3170 | 78.7 | 97.5 |
| Example 2 | 200 nm Si | 3594 | 2819 | 78.5 | 97.2 |
| Example 3 | 100 nm Si | 3076 | 1804 | 58.7 | 96.9 |
| Comparative Example 1 | 300 nm Si | 3004 | 2011 | 67 | 97.1 |
| Comparative Example 2 | 200 nm Si | 2641 | 1488 | 56 | 96.9 |
| Comparative Example 3 | 100 nm Si | 2259 | 1051 | 47 | 96.7 |

As shown in Table 2, it is confirmed that in the case of the Si nanoparticle powder prepared by milling with an emulsifier according to Examples 1-3, capacity characteristics of silicon itself improved, compared to Si nanoparticle powder having the same particle size obtained by using a conventional milling process Manufacture of Lithium Battery

EXAMPLE 4

Initially, thin graphite (Japanese graphite product—D50 5 micron, Nippon Graphite Industries, Shiga-ken, Japan) was mixed with each of the Si nanoparticle powders prepared according to Example 1 at a ratio of 7:3, and then, the mixtures was spherized by using a Hybridizer (product of Nara machine, Model name: NHS) at a rotation rate of 14,500 rpm for 10 minutes, and then, pitch coating was performed with a 10 weight % coal tar pitch. The pitch-coated spherical particles were heat treated at a temperature of 800° C., thereby completing the preparation of a negative active material.

The negative active material and product name LSR7 (manufacturer: Hitachi Chemical, a binder composed of 23 wt % PAI, and 97 wt % N-methyl-2-pyrrolidone), which is a binder, were mixed at a weight ratio of 94:6, and N-methylpyrrolidone was added thereto to control a viscosity thereof such that a solid content of the mixture is 60 wt % to prepare a negative active material slurry. The negative active material slurry was coated on a copper foil current collector having a thickness of 10 μm to afford a negative electrode plate, and the coated negative electrode plate was dried at a temperature of 120° C. for 15 minutes, followed by being pressed, to afford a negative electrode having a thickness of 60 μm. A counter electrode formed of Li metal was used, a polyethylene separator (product name: STAR20, Asahi Kasei) having a thickness of 20 μm was used, and an electrolytic solution was used, and the result structure is compressed to complete the manufacturing of a 2016R-type semi battery. In this regard, as an electrolyte, 1.10 M $LiPF_6$ dissolved in a mixed solvent, including EC, EMC, and DEC (a volumetric ratio of EC:EMC:DEC was 3:3:4), was used.

EXAMPLE 5

A lithium battery was manufactured in the same manner as in Example 4, except that the Si nanoparticle powder prepared according to Example 2 was used in preparing a negative active material.

EXAMPLE 6

A lithium battery was manufactured in the same manner as in Example 4, except that the Si nanoparticle powder prepared according to Example 3 was used in preparing a negative active material.

COMPARATIVE EXAMPLE 4

A lithium battery was manufactured in the same manner as in Example 4, except that the Si nanoparticle powder prepared according to Comparative Example 1 was used in preparing a negative active material.

COMPARATIVE EXAMPLE 5

A lithium battery was manufactured in the same manner as in Example 4, except that the Si nanoparticle powder prepared according to Comparative Example 2 was used in preparing a negative active material.

COMPARATIVE EXAMPLE 6

A lithium battery was manufactured in the same manner as in Example 4, except that the Si nanoparticle powder prepared according to Comparative Example 3 was used in preparing a negative active material.

EVALUATION EXAMPLE 4

Charging and Discharging Test

Capacity and Lifespan Evaluation

The coin cells were subjected to a formation process, as follows: each of the coin cells manufactured as described above was left to sit at room temperature (25° C.) for 20 hours, 0.01 C cut-off charging was performed on the coin cells at a charging rate of 0.1 C until a voltage reached 0.01V (vs. Li), and then, 1.5 V cut-off discharging was performed on the coin cells at a discharging rate of 0.1 C.

Subsequently, the coin cells were repeatedly charged and discharged respectively at charging and discharging rates of 0.2 C (2 cycles), and 0.5 C (50 cycles).

Figure 5:
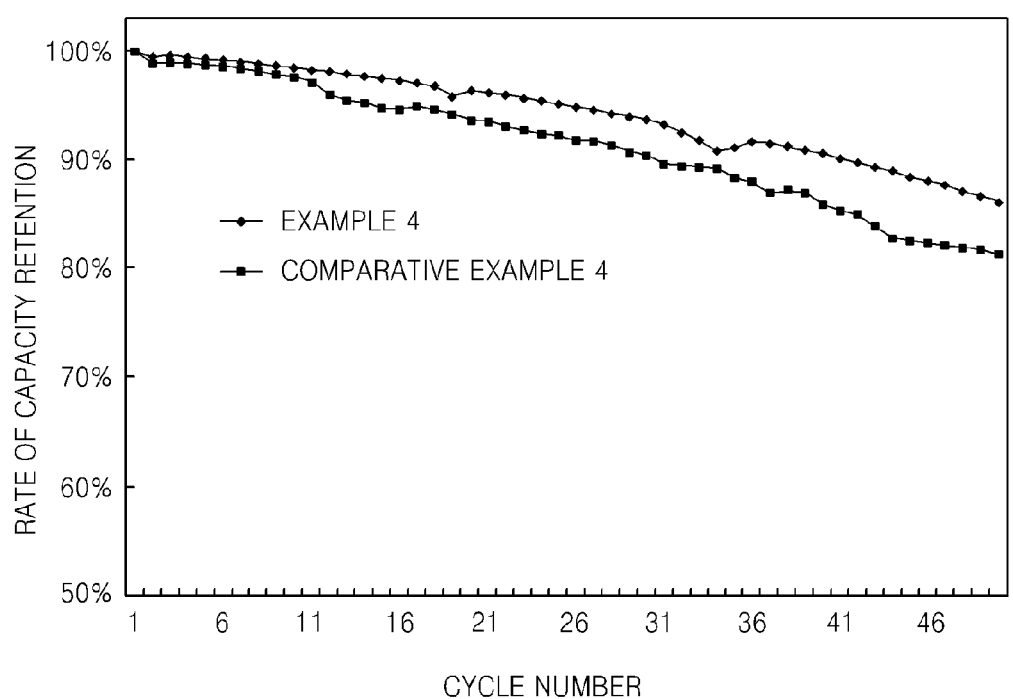
FIG. 5 is a graph of the rate of capacity retention of lithium batteries manufactured according to Example 4 and Comparative Example 4.

Measurement results are shown in Table 3. A graph of a rate of capacity retention of the lithium batteries manufactured according to Example 4 and Comparative Example 4 is shown in FIG. 5. Herein, the rate of capacity retention is defined as Equation 2 below.

Rate of capacity retention [%]=[discharging capacity
in each cycle/discharging capacity in the first
cycle]×100.   Equation 2

TABLE 3

|  | Si nano powder used in negative active material | Charge (mAh/g) | Discharge (mAh/g) | Initial efficiency (%) | Rate of Capacity retention @50 cycles (%) |
|---|---|---|---|---|---|
| Example 4 | 300 nm Si of Example 1 | 1020 | 853 | 83.6 | 86 |
| Example 5 | 200 nm Si of Example 2 | 968 | 796 | 82.2 | 85 |
| Example 6 | 100 nm Si of Example 3 | 927 | 723 | 78.0 | 87 |

TABLE 3-continued

| | Si nano powder used in negative active material | Charge (mAh/g) | Discharge (mAh/g) | Initial efficiency (%) | Rate of Capacity retention @50 cycles (%) |
|---|---|---|---|---|---|
| Comparative Example 4 | 300 nm Si of Comparative Example 1 | 1043 | 833 | 79.8 | 80 |
| Comparative Example 5 | 200 nm Si of Comparative Example 2 | 1029 | 810 | 78.7 | 84 |
| Comparative Example 6 | 100 nm Si of Comparative Example 3 | 982 | 748 | 76.2 | 85 |
| Comparative Example 7 | Raw Si | 1244 | 945 | 76.1 | 64 |

As shown in Table 3 above, it was confirmed that the lithium batteries, including the negative active material that includes Si nanoparticle obtained by milling with an emulsifier, according to Examples 4-6 have higher initial efficiency and higher rates of capacity retention than those including the negative active material that includes Si nanoparticle obtained by milling without an emulsifier according to Comparative Examples 4-6.

As described above, according to embodiments relating to a method of preparing a negative active material, when silicon-based primary particles included in the negative active material are milled into a set size from silicon-based bulky particles, milling efficiency increases and a decrease in capacity decreases. In some embodiments, the obtained nano-size negative active material has excellent crystalline characteristics, high capacity, and high initial efficiency, due to a decrease in surface oxidation and surface damage.

In the present disclosure, the terms "Example," "Comparative Example" and "Evaluation Example" are used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A negative active material comprising silicon-based primary particles that are composed of crystalline silicon having a Raman shift in a range of 500 to 510 $cm^{-1}$ measured by Raman spectroscopy and that has an average particle size of about 100 to about 500 nm, wherein the silicon-based primary particles are Si, Si—Z alloy (where Z is at least one selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B (boron), Ge, P (phosphorus), As, Sb, Bi, S, Se, Te, and Po), or a combination thereof.

2. The negative active material of claim 1, wherein the silicon-based primary particles is Si nanoparticle powder that has a Raman shift in a range of 504 to 507 $cm^{-1}$ and does not have a Raman shift in a range of 493 to 497 $cm^{-1}$ measured by Raman spectroscopy.

3. The negative active material of claim 1, further comprising an amorphous carbonaceous coating layer formed on a surface of the silicon-based primary particles.

4. The negative active material of claim 3, wherein the amorphous carbonaceous coating layer comprises carbonized material, where the carbonized material may be made from an organic material selected from sucrose, glucose, galactose, fructose, lactose, starch, mannose, ribose, aldohexose, ketohexose, and a combination thereof.

5. The negative active material of claim 3, wherein an amount of the amorphous carbonaceous coating layer is in a range of about 1 to about 20 parts by weight based on 100 parts by weight of the silicon-based primary particles.

6. The negative active material of claim 3, wherein the amorphous carbonaceous coating layer has a thickness of about 1 to about 100 nm.

7. The negative active material of claim 3, wherein the amorphous carbonaceous coating layer is continuously formed on the surface of the silicon-based primary particles.

8. The negative active material of claim 1, wherein a capacity of the negative active material is in a range of about 3000 to about 3500 mAh/g.

9. A lithium battery comprising:
   a negative electrode comprising the negative active material of claim 1;
   a positive electrode that comprises a positive active material and is configured to face the negative electrode; and
   an electrolyte interposed between the negative electrode and the positive electrode.

10. The negative active material of claim 1, wherein the crystalline silicon has a Raman shift in a range of more than 500 but less than or equal to 510 $cm^{-1}$ measured by Raman spectroscopy.

* * * * *